(12) United States Patent
Zhang

(10) Patent No.: US 12,089,184 B2
(45) Date of Patent: Sep. 10, 2024

(54) METHOD AND DEVICE USED FOR WIRELESS COMMUNICATION WITH DISCONTINUOUS RECEPTION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 790 days.

(21) Appl. No.: 17/195,669

(22) Filed: Mar. 9, 2021

(65) Prior Publication Data

US 2021/0227506 A1 Jul. 22, 2021

Related U.S. Application Data

(63) Continuation of application No. PCT/CN2020/142081, filed on Dec. 31, 2020.

(30) Foreign Application Priority Data

Jan. 16, 2020 (CN) .......................... 202010047946.9
Dec. 17, 2020 (CN) .......................... 202011494836.3

(51) Int. Cl.
*H04W 72/02* (2009.01)
*H04W 24/08* (2009.01)
(Continued)

(52) U.S. Cl.
CPC ........... *H04W 72/02* (2013.01); *H04W 24/08* (2013.01); *H04W 24/10* (2013.01);
(Continued)

(58) Field of Classification Search
CPC .... H04L 5/0053; H04L 5/0058; H04W 72/02; H04W 24/08; H04W 24/10;
(Continued)

(56) References Cited

U.S. PATENT DOCUMENTS

2019/0053305 A1 2/2019 Saiwai et al.
2019/0150187 A1 5/2019 Park et al.
(Continued)

OTHER PUBLICATIONS

First Office Action received in application No. EP20829521.2 dated Dec. 1, 2023.
(Continued)

*Primary Examiner* — Khoa Huynh

(57) ABSTRACT

The present disclosure provides a method and device used for wireless communications with discontinuous reception. A first node receives first information, and the first information is used for determining an active time in a first time-resource pool; monitors a target signaling in a first time-resource sub-pool; and transmits a first radio signal in a first time-frequency resource block; wherein a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool. The present disclosure considers the influence of discontinuous reception on resource election, which can improve chances of successful transmission.

20 Claims, 6 Drawing Sheets

(51) Int. Cl.
  *H04W 24/10* (2009.01)
  *H04W 72/0446* (2023.01)
  *H04W 72/0453* (2023.01)
  *H04W 76/27* (2018.01)
(52) U.S. Cl.
  CPC ... *H04W 72/0446* (2013.01); *H04W 72/0453* (2013.01); *H04W 76/27* (2018.02)
(58) Field of Classification Search
  CPC ......... H04W 72/0446; H04W 72/0453; H04W 76/27; H04W 72/20; H04W 72/542; H04W 72/569; H04W 4/40; H04W 4/70; H04W 76/28
  See application file for complete search history.

(56) References Cited

U.S. PATENT DOCUMENTS

| | | | |
|---|---|---|---|
| 2019/0373647 A1 | 12/2019 | Rugeland et al. | |
| 2021/0068125 A1* | 3/2021 | Lin | H04W 72/0453 |
| 2021/0258921 A1* | 8/2021 | Zhang | H04W 72/40 |

OTHER PUBLICATIONS

First Search Report of Chinese patent application No. CN202011494836.3 dated Jan. 6, 2022.
Supplementary Search Report of Chinese patent application No. CN202011494836.3 dated Jan. 28, 2022.
Qualcomm Incorporated "MBMS reception in Receive Only Mode"3GPP TSG-RAN2 Meeting #104 R2-1817787 Nov. 1, 2018.

* cited by examiner

Case A

Case B

METHOD AND DEVICE USED FOR WIRELESS COMMUNICATION WITH DISCONTINUOUS RECEPTION

CROSS REFERENCE TO RELATED APPLICATIONS

This application is a continuation of International Application No. PCT/CN2020/142081, filed Dec. 31, 2020, claims the priority benefit of Chinese Patent Application No. 202011494836.3, filed on Dec. 17, 2020, and the priority benefit of Chinese Patent Application No. 202010047946.9, filed on Jan. 16, 2020, the full disclosure of which is incorporated herein by reference.

BACKGROUND

Technical Field

The present disclosure relates to methods and devices in wireless communication systems, and in particular to a method and device in Sidelink wireless communications that supports discontinuous reception.

Related Art

Discontinuous Reception (DRX) is a common method in cellular communications, which can reduce power consumption of communication terminals and increase stand-by time. A base station controls a timer related to DRX with Downlink Control Information (DCI) or a Medium Access Control (MAC) Control Element (CE), so as to control whether a terminal performs wireless reception in a given slot or subframe.

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR. In response to rapidly growing Vehicle-to-Everything (V2X) traffic, 3GPP has started standards setting and research work under the framework of NR. The WI was decided to be initiated to standardize NR V2X DRX at 3GPP RAN #86 Plenary Session.

SUMMARY

The inventors have found through researches that, in resource allocation mode of NR V2X mode 2, when a User Equipment (UE) acquires time-frequency resources that can be used for a transmission through sensing, it does not take the influence of DRX into account, thus resulting in incompleteness in sensed information. And if these pieces of information are further used for determining the time-frequency resources for a transmission, then the transmission may be failed. Therefore, the UE may not be able to acquire time-frequency resources for a transmission effectively according to existing sensing mechanism.

In view of the above problem, the present disclosure provides a solution. It should be noted that NR V2X scenario is only illustrated as a typical application scenario or example in the description of the present disclosure; the present disclosure is also applicable to scenarios facing similar problems (such as relay network, Device-to-Device (D2D) network, cellular network and scenarios that support half-duplex UE) other than the NR V2X, and technical effects similar in the NR V2X scenario can also be achieved. Besides, a unified solution for different scenarios (including but not limited to the NR V2X scenario and Downlink communication scenario) can also help reduce hardware complexity and cost. The embodiments of a first node in the present disclosure and the characteristics of the embodiments may be applied to any other node if no conflict is incurred, and vice versa. The embodiments of the present disclosure and the characteristics of the embodiments may be mutually combined if no conflict is incurred. Particularly, for interpretations of the terminology; nouns, functions and variants (if not specified) in the present disclosure, refer to definitions given in TS36 series, TS38 series and TS37 series of 3GPP specifications.

The present disclosure provides a method in a first node for wireless communications, comprising:
   receiving first information, the first information being used for determining an active time in a first time-resource pool; monitoring a target signaling in a first time-resource sub-pool; and transmitting a first radio signal in a first time-frequency resource block;
   herein, a first parameter set is used for determining the first time-frequency resource block, the first
   time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the first radio signal is transmitted on a Sidelink (SL).

In one embodiment, the first node monitors any received target signaling in the first time-resource sub-pool.

In one embodiment, the first parameter set used for determining the first time-frequency resource block is one of the first candidate parameter set or the second candidate parameter set, which can avoid incompleteness in sensed information, thus avoiding possible transmission failure.

In one embodiment, the first node judges whether the first parameter set is determined out of the first candidate parameter set or the second candidate parameter set according to a length of the first time-resource sub-pool, which can further improve effectiveness of sensed information to improve effectiveness of a selected first time-frequency resource block, thus improving chances of successful transmission.

Specifically, according to one aspect of the present disclosure, the above method is characterized in also comprising:
   maintaining a first timer;
   herein, the active time in the first time-resource pool comprises a time when the first timer is running.

Specifically, according to one aspect of the present disclosure, the above method is characterized in also comprising:
   the active time in the first time-resource pool comprising a Downlink reception time;
   herein, the first radio signal is transmitted on an SL.

Specifically, according to one aspect of the present disclosure, the above method is characterized in also comprising:

performing a measurement in a second time-resource sub-pool;

herein, the second candidate parameter set is determined based on a measurement performed in the second time-resource sub-pool, and at least one slot in the second time-resource sub-pool is prior to the first time-resource sub-pool.

In one embodiment, a target signaling is measured in the second time-resource sub-pool.

In one embodiment, the second time-resource sub-pool comprises a slot prior to the first time-resource sub-pool, which enables the second candidate parameter set measured in the second time-resource sub-pool to be more complete, thus avoiding possible transmission failure.

Specifically, according to one aspect of the present disclosure, the above method is characterized in also comprising:

when the length of the first time-resource sub-pool is greater than a first threshold, determining the first parameter set out of the first candidate parameter set; when the length of the first time-resource sub-pool is less than a first threshold, determining the first parameter set out of the second candidate parameter set.

In one embodiment, when the length of the first time-resource sub-pool is equal to a first threshold, the first parameter set is determined out of the first candidate parameter set.

In one embodiment, when the length of the first time-resource sub-pool is equal to a first threshold, the first parameter set is determined out of the second candidate parameter set.

The present disclosure provides a method in a second node for wireless communications, comprising:
  transmitting first information, the first information being used for indicating an active time in a first time-resource pool; a target signaling being monitored in a first time-resource sub-pool; and
  a first time-frequency resource block being used for transmitting a first radio signal;
  herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

Specifically, according to one aspect of the present disclosure, the above method is characterized in also comprising:
  a first timer being maintained;
  herein, the active time in the first time-resource pool comprises a time when the first timer is running.

Specifically, according to one aspect of the present disclosure, the above method is characterized in also comprising:
  the active time in the first time-resource pool comprising a Downlink transmission time;
  herein, the first radio signal is transmitted on an SL.

Specifically, according to one aspect of the present disclosure, the above method is characterized in also comprising:
  the target signaling being measured in a second time-resource sub-pool;

herein, the second candidate parameter set is determined based on a measurement performed in the second time-resource sub-pool, and at least one slot in the second time-resource sub-pool is prior to the first time-resource sub-pool.

Specifically, according to one aspect of the present disclosure, the above method is characterized in also comprising:
  when the length of the first time-resource sub-pool is greater than a first threshold, determining the first parameter set out of the first candidate parameter set: when the length of the first time-resource sub-pool is less than a first threshold, determining the first parameter set out of the second candidate parameter set.

In one embodiment, when the length of the first time-resource sub-pool is equal to a first threshold, the first parameter set is determined out of the first candidate parameter set.

In one embodiment, when the length of the first time-resource sub-pool is equal to a first threshold, the first parameter set is determined out of the second candidate parameter set.

The present disclosure provides a first node for wireless communication, comprising:
  a first receiver, receiving first information, the first information being used for determining an active time in a first time-resource pool; monitoring a target signaling in a first time-resource sub-pool; and
  a first transmitter, transmitting a first radio signal in a first time-frequency resource block;
  herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

The present disclosure provides a second node for wireless communications, comprising:
  a second transmitter, transmitting first information, the first information being used for indicating an active time in a first time-resource pool; a target signaling being monitored in a first time-resource sub-pool; and
  a first time-frequency resource block being used for transmitting a first radio signal;
  herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the method in the present disclosure is advantageous in the following aspects:
  the method in the present disclosure considers the influence of the DRX on sensing a time-frequency resource block in resource allocation mode of NR SL mode2, selects more suitable time-frequency resources for SL transmission to improve chances of successful transmission;

the method in the present disclosure introduces two candidate parameter sets and selects whether a first parameter set is selected out of a first candidate parameter set or a second candidate parameter set according to a length of a first time-resource sub-pool, which can effectively avoid information incompleteness incurred by a measurement performed when there is only one candidate parameter set, thus avoiding possible transmission failure.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
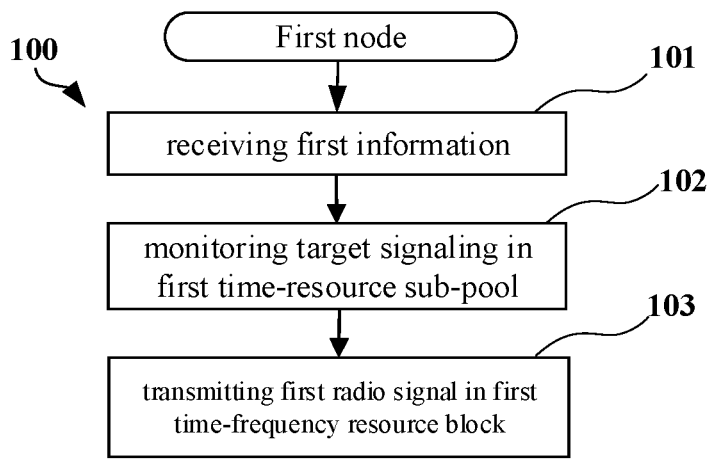
FIG. 1 illustrates a flowchart of first information, a target signaling and a first radio signal according to one embodiment of the present disclosure.

Embodiment 1 illustrates a flowchart of first information, a target signaling and a first radio signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives first information in step 101, and the first information is used for determining an active time in a first time-resource pool; monitors a target signaling in a first time-resource sub-pool in step 102, and the first time-resource sub-pool belongs to the active time in the first time-resource pool; transmits a first radio signal in a first time-frequency resource block in step 103, and a first parameter set is used for determining the first time-frequency resource block; the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the first information is high-layer information.

In one embodiment, the first information is transmitted via a high-layer signaling.

In one embodiment, the first information is transmitted via a physical-layer signaling.

In one embodiment, the first information comprises all or part of a high-layer signaling.

In one embodiment, the first information comprises all or part of a physical-layer signaling.

In one embodiment, the first information is transmitted via an air interface.

In one embodiment, the first information is transmitted via a radio interface.

In one embodiment, the first information is transmitted by the second node in the present disclosure to the first node in the present disclosure.

In one embodiment, the first information is transmitted via a DL.

In one embodiment, the first information is transmitted via an SL.

In one embodiment, the first information is transmitted via a Uu interface.

In one embodiment, the first information is transmitted via a PC5 interface.

In one embodiment, the first information is transmitted inside the first node in the present disclosure.

In one embodiment, the first information is transferred from a higher layer of the first node in the present disclosure to a physical layer of the first node.

In one embodiment, the first information is configured.

In one embodiment, the first information is pre-configured.

In one embodiment, the first information comprises all or part of Information Elements (IE) in a Radio Resource Control (RRC) signaling.

In one embodiment, the first information comprises all or part of fields of an IE in an RRC signaling.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Physical Downlink Control Channel (PDCCH).

In one embodiment, the first information comprises all or part of fields in a DCI signaling.

In one embodiment, the first information is transmitted through a Sidelink Shared Channel (SL-SCH).

In one embodiment, the first information is transmitted through a Physical Sidelink Shared Channel (PSSCH).

In one embodiment, the first information is transmitted through a Physical Sidelink Control Channel (PSCCH).

In one embodiment, the first information comprises all or part of fields of a Sidelink Control Information (SCI) signaling.

In one embodiment, the first information is Broadcast.

In one embodiment, the first information is Unicast.

In one embodiment, the first information is Cell-Specific.

In one embodiment, the first information is UE-specific.

In one embodiment, the first information is UE group-specific.

In one embodiment, the first information is carried via the target signaling in the present disclosure.

In one embodiment, the first information is carried via a signaling other than the target signaling in the present disclosure.

In one embodiment, the first information comprises a field in the target signaling in the present disclosure.

In one embodiment, the first information comprises an initiative value of the first timer.

In one embodiment, the target signaling is SCI.

In one embodiment, the target signaling carries priority information.

In one embodiment, the target signaling is DCI.

In one embodiment, the target signaling is a PDCCH.

In one embodiment, the target signaling is a PSCCH.

In one embodiment, the target signaling is a PDSCH.

In one embodiment, the target signaling is a PSSCH.

In one embodiment, the target signaling is transmitted through a PSSCH Piggyback.

In one embodiment, the target signaling is transmitted via an air interface.

In one embodiment, the target signaling is transmitted via a radio interface.

In one embodiment, the target signaling is transmitted via a PC5 interface.

In one embodiment, the target signaling is transmitted via a Uu interface.

In one embodiment, the target signaling is transmitted through an SL.

In one embodiment, the target signaling is transmitted through a DL.

In one embodiment, the target signaling is a MAC layer signaling.

In one embodiment, the target signaling is a physical-layer signaling.

In one embodiment, the target signaling is a dynamic signaling.

In one embodiment, the target signaling is UE-specific.

In one embodiment, the target signaling is UE Group-Specific.

In one embodiment, the target signaling is Unicast.

In one embodiment, the target signaling is Groupcast.

In one embodiment, the target signaling is Broadcast.

In one embodiment, the first receiver performs a measurement in the first time-resource sub-pool.

In one embodiment, only when the first parameter set is the first candidate parameter set, the first receiver performs a measurement in the first time-resource sub-pool.

In one embodiment, the phrase monitoring a target signaling in the first time-resource sub-pool comprises performing blind decoding on the target signaling in the first time-resource sub-pool.

In one embodiment, the phrase monitoring a target signaling in the first time-resource sub-pool comprises respectively performing blind decoding in each of multiple Resource Element (RE) sets in the first time-resource sub-pool, if the decoding is correct, the target signaling is successfully received: if the decoding is wrong, the target signaling is not received.

In one embodiment, the phrase monitoring a target signaling in the first time-resource sub-pool comprises performing energy detection on the target signaling in the first time-resource sub-pool.

In one subembodiment of the above embodiment, the phrase monitoring a target signaling in the first time-resource sub-pool comprises performing blind decoding on the target signaling in the first time-resource sub-pool, when the target signaling is successfully decoded, acquiring carried priority information that indicates a target radio signal.

In one embodiment, the phrase monitoring a target signaling in the first time-resource sub-pool comprises performing blind decoding on the target signaling in the first time-resource sub-pool and performing energy detection on a target radio signal; the target signaling is used for indicating time-frequency resources occupied by the target radio signal and an MCS employed by the target radio signal.

In one embodiment, the phrase monitoring a target signaling in the first time-resource sub-pool comprises performing blind decoding on the target signaling in the first time-resource sub-pool and performing energy detection on a reference signal of a target radio signal; the target signaling is used for indicating time-frequency resources occupied by the target radio signal and an MCS employed by the target radio signal.

In one embodiment, the phrase monitoring a target signaling in the first time-resource sub-pool comprises performing blind decoding on the target signaling in the first time-resource sub-pool and performing energy detection on a reference signal of a target radio signal: when the target signaling is successfully decoded, acquiring carried priority information that indicates the target radio signal; the target signaling is used for indicating time-frequency resources occupied by the target radio signal and an MCS employed by the target radio signal.

In one embodiment, the phrase monitoring a target signaling in the first time-resource sub-pool comprises performing blind decoding on the target signaling in the first time-resource sub-pool, and performing energy detection on a reference signal of a target radio signal and performing decoding on a target radio signal; the target signaling is used for indicating time-frequency resources occupied by the target radio signal and an MCS employed by the target radio signal.

In one subembodiment of the above three embodiments, the phrase performing energy detection on a reference signal of a target radio signal comprises determining a Physical Sidelink Shared Channel-Reference Signal Received Power (PSSCH-RSRP) parameter set through energy detection.

In another subembodiment of the above three embodiments, the phrase performing energy detection on a reference signal of a target radio signal comprises determining a Sidelink-Received Signal Strength Indication (S-RSSI) parameter set through energy detection.

In another subembodiment of the above three embodiments, the phrase performing energy detection on a reference signal of a target radio signal comprises determining a Sidelink-Reference Signal Receiving Quality (S-RSRQ) parameter set through energy detection.

In one embodiment, the phrase monitoring a target signaling in the first time-resource sub-pool comprises performing a Cyclic Redundancy Check (CRC) on the target signaling in the first time-resource sub-pool.

In one embodiment, a transmitter of the target signaling is a transmitter other than the first node.

In one embodiment, the second candidate parameter set is fixed.

In one embodiment, the second candidate parameter set is configured.

In one embodiment, the second candidate parameter set is configured by a downlink signaling.

In one embodiment, the downlink signaling is Broadcast.

In one embodiment, the downlink signaling is a higher-layer signaling.

In one embodiment, the first time-resource pool comprises a fixed positive integer number of slot(s).

In one embodiment, the first time-resource pool comprises 1000 slots.

In one embodiment, the first time-resource pool comprises a fixed positive integer number of SL slot(s).

In one embodiment, the first time-resource pool comprises 1000 SL slots.

In one embodiment, the first time-resource pool comprises a configurable number of slot(s).

In one embodiment, the first time-resource pool comprises a configurable number of SL slot(s).

In one embodiment, the first time-resource sub-pool completely overlaps with the active time of the first time-resource pool.

In one embodiment, there exists at least one slot belonging to the active time of the first time-resource pool instead of belonging to the first time-resource sub-pool.

In one embodiment, the first time-resource sub-pool is each slot that performs a wireless reception.

In one embodiment, the first time-resource sub-pool is each slot that performs a SL wireless reception.

In one embodiment, the first time-resource sub-pool is each slot that performs an action other than a wireless transmission.

In one embodiment, the first time-resource sub-pool is each slot that performs an action other than a SL wireless transmission.

In one embodiment, the target signaling is monitored in each slot in the first time-resource sub-pool.

In one embodiment, the target signaling is monitored in part of slots in the first time-resource sub-pool.

In one embodiment, the target signaling is monitored in each slot that performs an action other than a wireless transmission in the first time-resource sub-pool.

In one embodiment, the target signaling is monitored in each slot that performs an action other than an SL wireless transmission in the first time-resource sub-pool.

In one embodiment, the target signaling is monitored in each slot that performs a wireless reception in the first time-resource sub-pool.

In one embodiment, the target signaling is monitored in each slot that performs a SL wireless reception in the first time-resource sub-pool.

In one embodiment, parameter types comprised in the first candidate parameter set and the second parameter set are the same.

In one embodiment, the first candidate parameter set and the second parameter set respectively comprise Channel Busy Ratios (CBRs).

In one embodiment, the first candidate parameter set and the second parameter set respectively comprise PSSCH-RSRP.

In one embodiment, the first candidate parameter set and the second parameter set respectively comprise S-RSSI.

In one embodiment, the first candidate parameter set and the second parameter set respectively comprise S-RSRQ.

In one embodiment, the first candidate parameter set and the second parameter set respectively comprise priorities.

In one embodiment, the first candidate parameter set and the second parameter set respectively comprise PSSCH-RSRP and a priority:

In one embodiment, the first candidate parameter set and the second parameter set respectively comprise S-RSSI and a priority.

In one embodiment, the first candidate parameter set and the second parameter set respectively comprise S-RSRQ and a priority.

In one embodiment, the first candidate parameter set is unrelated to a measurement performed outside the first time-resource sub-pool.

In one embodiment, the phrase that a first candidate parameter set is determined based on a measurement performed in the first time-resource sub-pool comprises; the first candidate parameter set is determined by monitoring the target signaling in the first time-resource sub-pool.

In one embodiment, the phrase that a first candidate parameter set is determined based on a measurement performed in the first time-resource sub-pool comprises; the first candidate parameter set comprises available time-frequency resources reported to a higher layer that are acquired through sensing in the first time-resource sub-pool according to 3GPP TS 38.213, 38.214 or 36.213.

In one embodiment, the first time-frequency resource block comprises a positive integer number of sub-channel(s) in frequency domain.

In one embodiment, the first time-frequency resource block comprises a positive integer number of Physical resource block(s) (PRB) in frequency domain.

In one embodiment, the first time-frequency resource block comprises multiple REs in frequency domain.

In one embodiment, the first time-frequency resource block comprises consecutive frequency-domain resources in frequency domain.

In one embodiment, the first time-frequency resource block comprises discrete frequency-domain resources in frequency domain.

In one embodiment, the first time-frequency resource block belongs to a carrier in frequency domain.

In one embodiment, frequency-domain resources of the first time-frequency resource block belong to an SL Bandwidth part (BWP).

In one embodiment, frequency-domain resources of the first time-frequency resource block belong to an SL resource pool.

In one embodiment, frequency-domain resources of the first time-frequency resource block can also belong to an Uplink BWP.

In one embodiment, the first time-frequency resource block comprises a positive integer number of multi-carrier symbol(s) in time domain.

In one embodiment, the first time-frequency resource block comprises a positive integer number of slots that are consecutive in time domain.

The first time-frequency resource block comprises a number of (greater than 1) Orthogonal Frequency Division Multiplexing (OFDM) symbols that are discrete in time domain.

In one embodiment, the first time-frequency resource block comprises a number of (greater than 1) slots that are discrete in time domain.

In one embodiment, the multicarrier symbol is an OFDM symbol.

In one embodiment, the multicarrier symbol is a Single-Carrier Frequency-Division Multiple Access (SC-FDMA) symbol.

In one embodiment, the multi-carrier symbol is a Filter Bank Multicarrier (FBMC) symbol.

In one embodiment, the first time-frequency resource block is reserved for SCI.

In one embodiment, the first time-frequency resource block is reserved for PSSCH transmission.

In one embodiment, the first time-frequency resource block is reserved for SL data transmission.

In one embodiment, the first time-frequency resource block is reserved for SL Channel Status Information (CSI) transmission.

In one embodiment, the first time-frequency resource block is reserved for Physical Sidelink Feedback Channel (PSFCH) transmission.

In one embodiment, the first time-frequency resource block is part or all reserved for Sidelink Feedback Control Information (SFCI).

In one embodiment, the first time-frequency resource block is reserved for a SL PSSCH-RSRP report.

In one embodiment, the first time-frequency resource block is reserved for a SL S-RSSI report.

In one embodiment, the first time-frequency resource block is reserved for a S-RSSI report.

In one embodiment, the first radio signal is transmitted via an air interface.

In one embodiment, the first radio signal is transmitted via a radio interface.

In one embodiment, the first radio signal is transmitted via a PC5 interface.

In one embodiment, the first radio signal is transmitted via an SL.

In one embodiment, all or part of a Transport Block (TB) is used for generating the first radio signal.

In one embodiment, all or part of a TB and a reference signal are used for generating the first radio signal.

In one embodiment, all or part of bits in a TB block acquires the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, and Modulation and Upconversion.

In one embodiment, all or part of bits in SCI acquire the first radio signal sequentially through CRC Calculation, Channel Coding, Rate Matching, Scrambling, Modulation, Mapping to Physical Resources, OFDM Baseband Signal Generation, and Modulation and Upconversion.

In one embodiment, a target receiver of the first radio signal is a UE.

In one embodiment, a target receiver of the first radio signal is a Roadside Unit (RSU).

In one embodiment, a target receiver of the first radio signal is an On-Board Unit (OBU).

In one embodiment, a target receiver of the first radio signal is a handheld terminal.

In one embodiment, a target receiver of the first radio signal is a Laptop.

In one embodiment, a target receiver of the first radio signal is a node other than the first node in the present disclosure.

Embodiment 2

Figure 2:
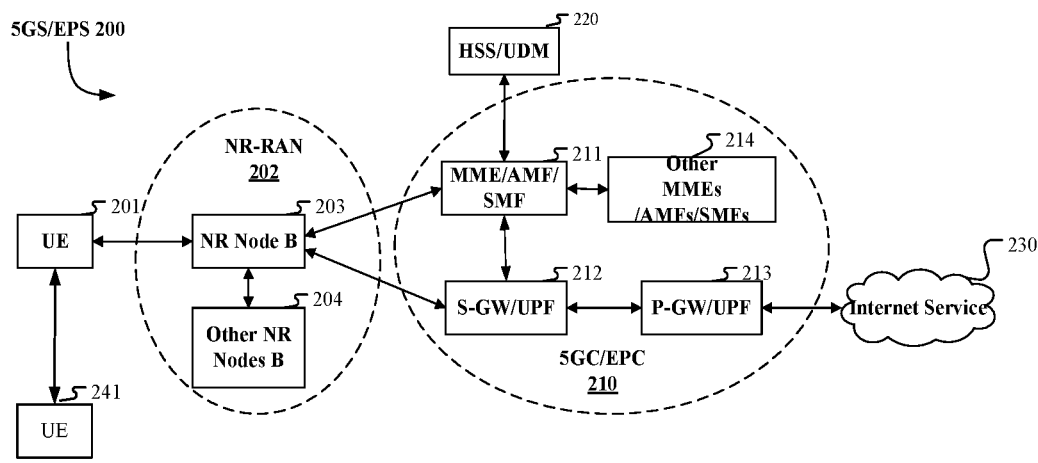
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, an aircraft or a territorial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports SL communications.

In one embodiment, the UE 201 supports a PC5 interface.

In one embodiment, the UE 201 supports Internet of Vehicles.

In one embodiment, the UE 201 supports V2X traffic.

In one embodiment, the UE 201 corresponds to the second node in the present disclosure.

In one embodiment, the gNB 203 corresponds to the second node in the present disclosure.

In one embodiment, the gNB 203 supports Internet of Vehicles.

In one embodiment, the gNB 203 supports V2X traffic.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay inequality.

In one embodiment, the gNB 203 is a flight platform device.

In one embodiment, the gNB 203 is a satellite equipment.

In one embodiment, a wireless link between the UE 201 to gNB 203 is an Uplink.

In one embodiment, a wireless link between gNB 203 to UE 201 is a Downlink.

In one embodiment, a wireless link between the UE 201 and the UE 241 corresponds to an SL in the present disclosure.

In one embodiment, the UE 201 supports DRX transmission.

In one embodiment, the UE 241 supports DRX transmission.

Embodiment 3

Figure 3:
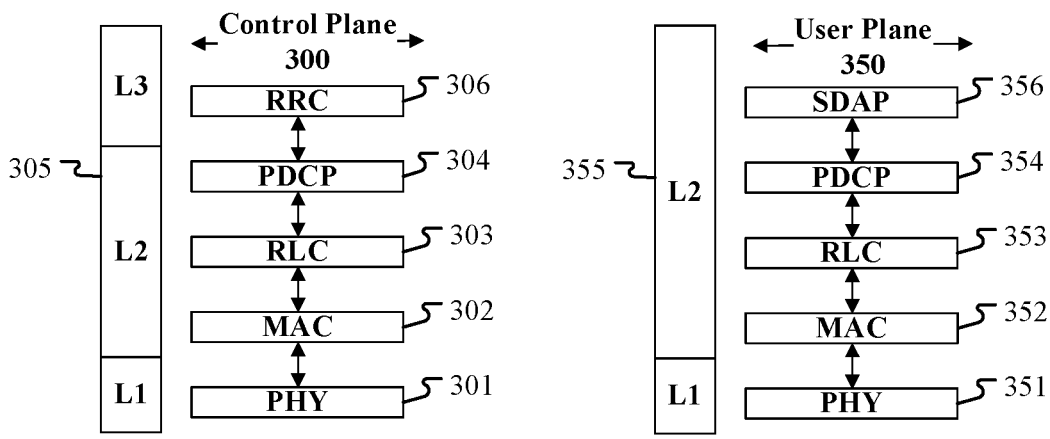
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Module) and a second node (gNB, UE or RSU in V2X, vehicle equipment or On-Board Communication Module), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a data packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also in charge of Hybrid Automatic Repeat Request (HARQ) operation. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QOS) streams and a Data Radio Bearer (DRB), so as to support diversified traffics. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the target signaling in the present disclosure is generated by the MAC 302 or the MAC 352.

In one embodiment, the target signaling in the present disclosure is generated by the PHY 301 or the PHY 351.

In one embodiment, the first radio signal in the present disclosure is generated by the RRC 306.

In one embodiment, the first radio signal in the present disclosure is generated by the MAC 302 or the MAC 352.

In one embodiment, the first radio signal in the present disclosure is generated by the PHY 301 or the PHY 351.

In one embodiment, the L2 layer 305 or 355 belongs to a higher layer.

In one embodiment, the L3 layer RRC sublayer 306 belongs to a higher layer.

Embodiment 4

Figure 4:
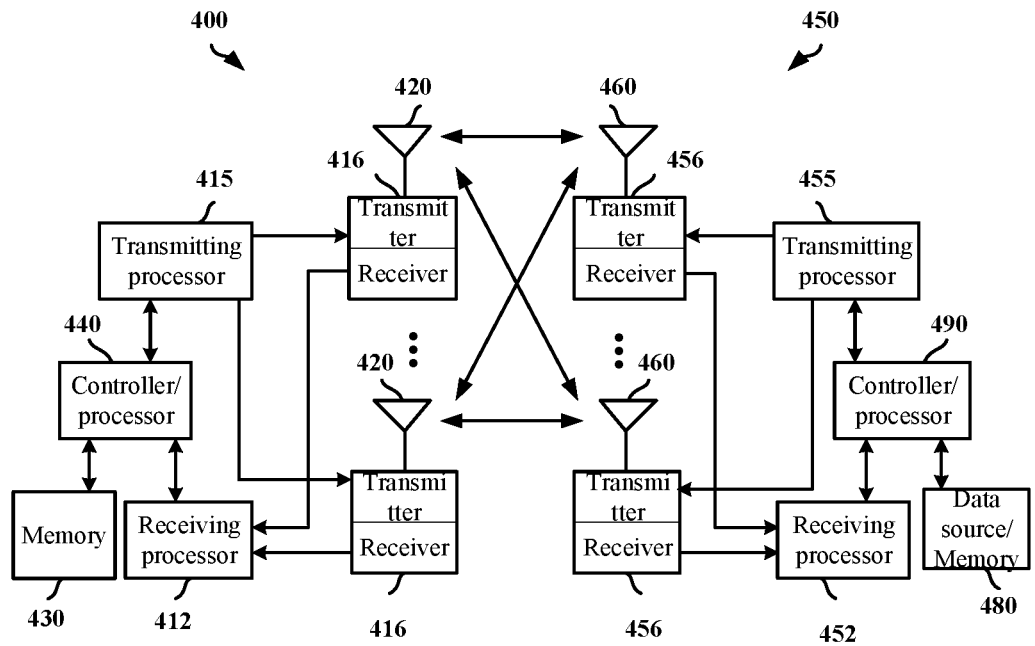
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a receiving processor 452, a transmitting processor 455, a transmitter/receiver 456 and a data source/memory 480, wherein the transmitter/receiver 456 comprises an antenna 460.

The second node (400) may comprise a controller/processor 440, a receiving processor 412, a transmitting processor 415, a transmitter/receiver 416, and a memory 430, wherein the transmitter/receiver 416 comprises an antenna 420.

In a transmission from the second node 400 to the first node 450, a higher layer packet, such as high-layer information comprised in first information in the present disclosure, is provided to the controller/processor 440. The controller/processor 440 implements the functionality of the L2 layer and above layers. In a transmission from the second node 400 to the first node 450, the controller/processor 440 provides header compression, encryption, packet segmentation and reordering, and multiplexing between a logical channel and a transport channel, and radio resource allocation of the first node 450 based on various priorities. The controller/processor 440 is also in charge of HARQ operation, retransmission of a lost packet, and a signaling to the first node 450, for example, the first information in the present disclosure is generated by the controller/processor 440. The transmitting processor 415 implements various signal processing functions of the L1 layer (that is, PHY), including coding, interleaving, scrambling, modulation, power control/allocation, precoding and generation of physical-layer control signaling. Generation of a physical layer signal of the first information in the present disclosure is performed in the transmitting processor 415. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals of the first information in the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 is in charge of the L2 layer and the above layers, the controller/processor 490 interprets the first information of the present disclosure. The controller/processor 490 can be connected to the memory 480 that stores program code and data. The data source/memory 480 may be called a computer readable medium.

In a transmission from the first node 450 to the second node 400, the data source/memory 480 provides higher-layer data to the controller/processor 490. The data source/memory 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, a retransmission of a lost packet and a signaling to the second node 410. The transmitting processor 455 performs various signal processing functions on the layer L1 (i.e., the physical layer). The signal transmitting processing function comprises performing coding and interleaving so as to ensure a Forward Error Correction (FEC) at the UE 450 side and performing modulation to baseband signals according to each modulation scheme (i.e., BPSK, QPSK, etc.). Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. The receiver 416 receives an RF signal via its corresponding antenna 420, and each receiver 416 recovers baseband information modulated to an RF carrier, and supplies the baseband information to the receiving processor 412. The receiving processor 412 performs various signal receiving processing functions of the L1 layer. The signal receiving processing functions include acquisition of multicarrier symbol streams, demodulation of multicarrier symbols in multicarrier symbol streams based on each modulation scheme (e.g., BPSK, QPSK), and then decoding and de-interleaving of the demodulated symbols so as to recover data or control signals transmitted by the first node 450 on a physical channel. The data and the control signal are then provided to the controller/processor 440. The controller/processor 440 implements the functionality of the L2 layer. The controller/processor 440 may be connected to the memory 430 that stores program code and data. The memory 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives first information in step 101, the first information being used for determining an active time in a first time-resource pool; monitors a target signaling in a first time-resource sub-pool in step 102; and transmits a first radio signal in a first time-frequency resource block in step 103; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the first node 450 comprises a memory that stores a computer readable instruction program. The computer readable instruction program generates an action when executed by at least one processor. The action includes: receiving first information in step 101, the first information being used for determining an active time in a first time-resource pool; monitoring a target signaling in a first time-resource sub-pool in step 102; and transmitting a first radio signal in a first time-frequency resource block in step 103; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the second node 400 comprises at least one processor and at least one memory. The at least one memory comprises computer program codes; the at least one memory and the computer program codes are configured to be used in collaboration with the at least one processor. The second node 400 at least: transmits first information, and the first information is used for indicating an active time in a first time-resource pool; a target signaling is monitored in a first time-resource sub-pool; and a first time-frequency resource block is used for transmitting a first radio signal; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the second node 400 comprises a memory that stores a computer readable instruction program. The computer readable instruction program generates an action when executed by at least one processor. The action includes: transmitting first information, the first information being used for indicating an active time in a first time-resource pool; a target signaling being monitored in a first time-resource sub-pool; and a first time-frequency resource block being used for transmitting a first radio signal; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, the first node 450 is a UE.

In one embodiment, the first node 450 is a UE that supports V2X.

In one embodiment, the first node 450 is a vehicle equipment.

In one embodiment, the first node 450 is an RSU.

In one embodiment, the second node 400 is a base station (gNB/eNB).

In one embodiment, the second node 400 is a base station that supports V2X.

In one embodiment, the second node 400 is a UE.

In one embodiment, the second node 400 is a UE that supports V2X.

In one embodiment, the second node 400 is a vehicle equipment.

In one embodiment, the second node 400 is an RSU.

In one embodiment, the receiver 456 (including the antenna 460), the receiving processor 452 and the controller/processor 490 are used to receive the first information in the present disclosure.

In one embodiment, the transmitter 416 (including the antenna 420), the transmitting processor 415 and the controller/processor 440 are used to transmit the first information in the present disclosure.

Embodiment 5

Figure 5:
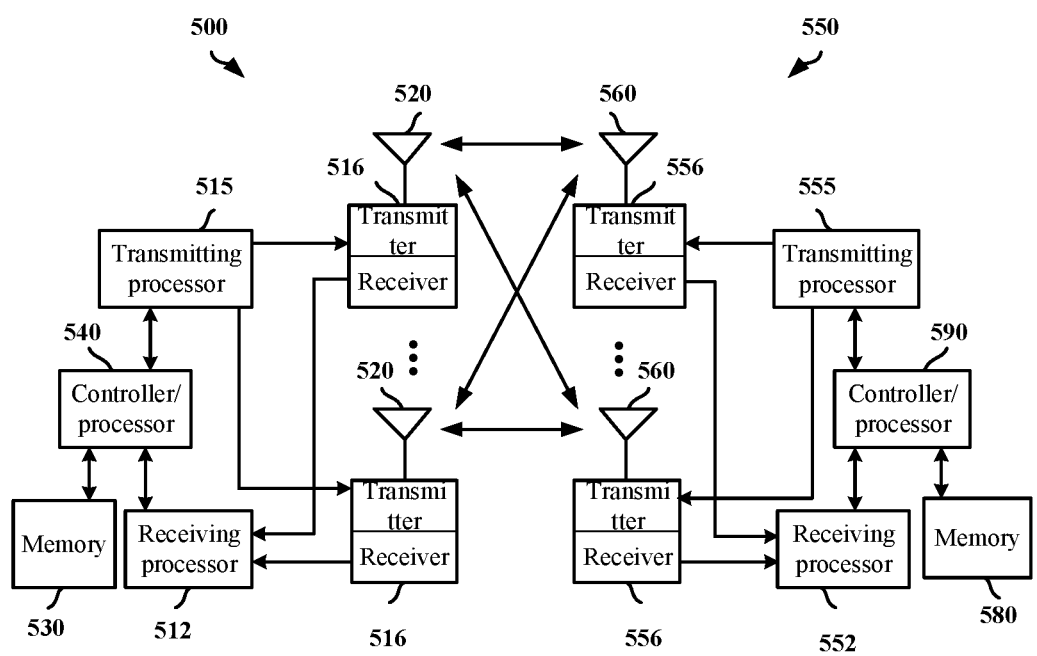
FIG. 5 illustrates a schematic diagram of a first node and another UE according to one embodiment of the present disclosure.

Embodiment 5 illustrates a schematic diagram of a first node and another UE according to the present disclosure, as shown in FIG. 5.

The first node (550) comprises a controller/processor 590, a memory 580, a receiving processor 552, a transmitter/receiver 556 and a transmitting processor 555, wherein the transmitter/receiver 556 comprises an antenna 560. Composition in the another UE (500) is the same as that in the first node 550.

In an SL transmission from the first node 550 to the another node 500, a higher layer packet that includes a first signal in the present disclosure is provided to the controller/processor 590. The controller/processor implements the functionality of the L2 layer. In an SL transmission, the controller/processor 590 provides header compression, encryption, packet segmentation and reordering, and multiplexing between a logical channel and a transport channel. The controller/processor 590 is also in charge of HARQ operation (if supported), a retransmission and a signaling to the UE 500. The transmitting processor 555 implements various signal processing functions of the L1 layer (that is, PHY), including coding, interleaving, scrambling, modulation, power control/allocation, precoding and generation of physical layer control signaling. Generation of the first radio signal in the present disclosure is performed in the transmitting processor 555. Modulated symbols are divided into parallel streams and each stream is mapped onto corresponding multicarrier subcarriers and/or multicarrier symbols, which are then mapped from the transmitting processor 555 to the antenna 560 via the transmitter 556 to be transmitted in the form of RF signals. At the receiving side, each receiver 516 receives an RF signal via a corresponding antenna 520, each receiver 516 recovers baseband information modulated to the RF carrier and provides the baseband information to the receiving processor 512. The receiving processor 512 provides various signal receiving functions for the L1 layer. The signal receiving processing functions include reception of a physical layer signal of the first radio signal in the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first communication node 550 on a physical channel, and the data or control signals are later provided to the controller/processor 540. The controller/processor 540 implements processing of the L2 layer and interprets the first radio signal of the present disclosure. The controller/processor 540 can be connected to a memory 530 that stores program code and data. The memory 530 may be called a computer readable medium.

In one embodiment, the transmitter 556 (including the antenna 560), the transmitting processor 555 and the controller/processor 590 are used to transmit the first radio signal in the present disclosure.

In one embodiment, the receiver 556 (including the antenna 560), the receiving processor 552 and the controller/processor 590 are used to monitor the target signaling in the present disclosure.

In one embodiment, the receiver 516 (including the antenna 520), the receiving processor 512 and the controller/processor 540 are used to receive the first radio signal in the present disclosure.

Embodiment 6

Figure 6:
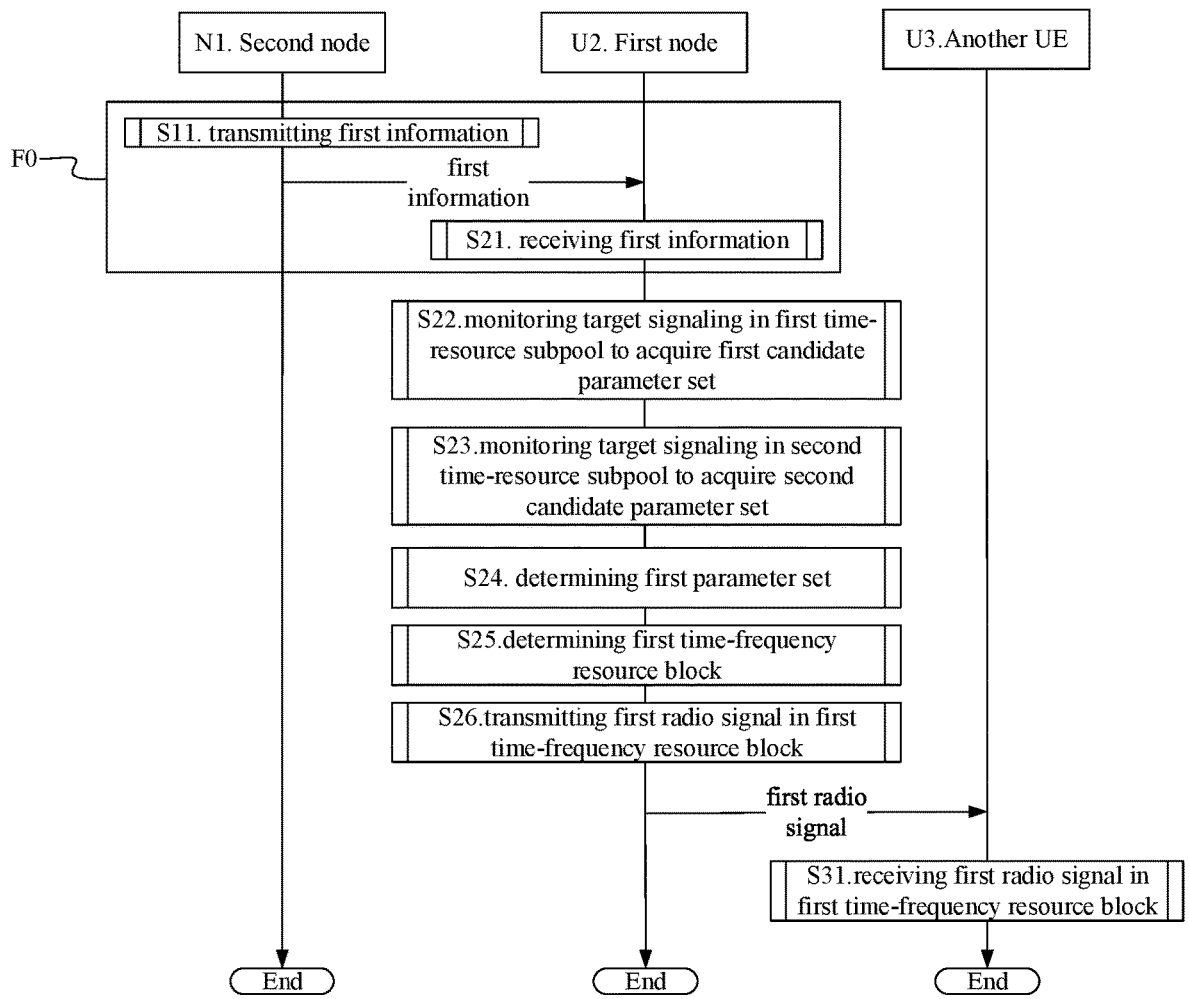
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second node N1 is a maintenance base station of a serving cell of a first node U2, and a first node U2 and another UE U3 are in communications via an SL. Particularly, order in the embodiment does not limit order of signal transmission and implementation in the present disclosure. In FIG. 6, steps in box F0 are optional.

The second node N1 transmits first information in step S11.

The first node U2 receives first information in step S21, monitors a target signaling in a first time-resource sub-pool in step S22, acquires a first candidate parameter set, monitors a target signaling in a second time-resource sub-pool in step S23, acquires a second candidate parameter set, determines a first parameter set in step S24, determines a first time-frequency resource block according to the first parameter set in step S25, and transmits a first radio signal in the first time-frequency resource block in step S26. The another UE U3 receives a first radio signal in step S31.

In Embodiment 6, the first information is used for determining an active time in a first time-resource pool; a target signaling is monitored in a first time-resource sub-pool; and a first radio signal is transmitted in a first time-frequency resource block; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set; a first timer is maintained; herein, the active time in the first time-resource pool comprises a time when the first timer is running; the active time in the first time-resource pool comprises a Downlink reception time; herein, the first radio signal is transmitted on an SL; a measurement is performed in a second time-resource sub-pool, herein, the second candidate parameter set is determined based on a measurement performed in the second time-resource sub-pool, and at least one slot in the second time-resource sub-pool is prior to the first time-resource sub-pool; when the length of the first time-resource sub-pool is greater than a first threshold, the first parameter set is determined out of the first candidate parameter set; and when the length of the first time-resource sub-pool is less than a first threshold, the first parameter set is determined out of the second candidate parameter set.

In one embodiment, the phrase maintaining a first timer comprises: the first node starts the first timer at a first time in the first time-resource pool.

In one embodiment, a position of the first time in the first time-resource pool is fixed.

In one embodiment, a position of the first time in the first time-resource pool is configured by a Downlink signaling.

In one embodiment, a position of the first time in the first time-resource pool is configured by the first information.

In one embodiment, the first node starting the first timer at a first time in the first time-resource pool is to set the first timer to 0.

In one embodiment, the phrase maintaining a first timer comprises: when a value of the first timer is less than a first expiration value, the first node increases a value of the first timer by 1 every time a slot passes.

In one embodiment, the phrase maintaining a first timer comprises: when a value of the first timer is less than a first expiration value, the first node increases a value of the first timer by 1 every time a slot that could be used for transmitting DCI passes.

In one embodiment, the phrase maintaining a first timer comprises: when a value of the first timer is less than a first expiration value, the first node increases a value of the first timer by 1 every time a slot that could be used for transmitting SCI passes.

In one embodiment, the phrase maintaining a first timer comprises: when a value of the first timer is equal to a first expiration time, the first node stops the first timer.

In one embodiment, the first expiration value is a positive integer.

In one embodiment, the first expiration value is a fixed value.

In one embodiment, the first expiration value is configured by a Downlink signaling.

In one embodiment, the first expiration value is configured by the first information.

In one embodiment, the first node starting the first timer at a first time in the first time-resource pool is to set the first timer to a first positive integer.

In one embodiment, the first positive integer is configured by a Downlink signaling.

In one embodiment, the first positive integer is configured by the first information.

In one embodiment, the first positive integer is a fixed value.

In one embodiment, the phrase maintaining a first timer comprises: when a value of the first timer is greater than 0, the first node subtracts a value of the first timer by 1 every time a slot passes.

In one embodiment, the phrase maintaining a first timer comprises: when a value of the first timer is greater than 0, the first node subtracts a value of the first timer by 1 every time a slot that could be used for transmitting DCI passes.

In one embodiment, the phrase maintaining a first timer comprises: when a value of the first timer is greater than 0, the first node subtracts a value of the first timer by 1 every time a slot that could be used for transmitting SCI passes.

In one embodiment, the phrase maintaining a first timer comprises: when a value of the first timer is equal to 0, the first node stops the first timer.

In one embodiment, the first timer is a drx-onDuration Timer.

In one embodiment, the first timer is a drx-onDuration TimerSL.

In one embodiment, the first timer is maintained in a MAC layer.

In one embodiment, the first timer is maintained by an MEC entity.

In one embodiment, when the first timer is running, the first node is in the active time in the first time-resource pool.

In one embodiment, when the first timer is running, the first node is in a continuous reception state in the first time-resource pool.

In one embodiment, when the first timer is running, the first node monitors a physical layer signaling in all D2D resource pools in the first time-resource pool.

In one embodiment, when the first timer is running, the first node monitors a physical layer signaling in all V2X resource pools in the first time-resource pool.

In one embodiment, when the first timer is running, the first node monitors DCI in all Downlink slots in the first time-resource pool.

In one embodiment, the Downlink reception time comprises a time when a scheduling request transmitted by the first transmitter is suspended.

In one embodiment, the Downlink reception time comprises a duration from when the first receiver successfully receives random access response information for contention-free random access to when the first receiver receives an earliest scheduling control signaling for new data transmission, wherein the successful reception time of the random access response information for contention-free random access is earlier than the reception time of a scheduling control signaling for new data transmission.

In one embodiment, the time when a scheduling request is suspended comprises a time from when a last symbol of the scheduling request is transmitted to when a scheduling control signaling for the scheduling request is received.

In one embodiment, the scheduling request is an Uplink scheduling request.

In one embodiment, the scheduling request is an SL scheduling request.

In one embodiment, the scheduling control signaling for new data transmission is an Uplink data transmission control signaling.

In one embodiment, the scheduling control signaling for new data transmission is a PDCCH.

In one embodiment, the scheduling control signaling for new data transmission comprises all or part of fields in a DCI signaling.

In one embodiment, a format of the scheduling control signaling for new data transmission is DCI format 0_0.

In one embodiment, a format of the scheduling control signaling for new data transmission is DCI format 0_1.

In one embodiment, the scheduling control signaling for new data transmission is a Downlink data transmission scheduling signaling.

In one embodiment, a format of the scheduling control signaling for new data transmission is DCI format 1_0.

In one embodiment, a format of the scheduling control signaling for new data transmission is DCI format 1_1.

In one embodiment, the scheduling control signaling for new data transmission is an SL data transmission scheduling signaling.

In one embodiment, the scheduling control signaling for new data transmission is an NR model SL data transmission control signaling.

In one embodiment, the scheduling control signaling for new data transmission comprises all or part of fields in an SCI signaling.

In one embodiment, a format of the scheduling control signaling for new data transmission is DCI format 3_1.

In one embodiment, the second time-resource sub-pool is each slot that performs wireless reception.

In one embodiment, the second time-resource sub-pool is each slot that performs SL wireless reception.

In one embodiment, the second time-resource sub-pool is each slot that performs an action other than wireless transmission.

In one embodiment, the second time-resource sub-pool is each slot that performs an action other than SL wireless transmission.

In one embodiment, the first receiver performs a measurement in the second time-resource sub-pool.

In one embodiment, only when the first parameter set is the second candidate parameter set, the first receiver performs a measurement in the second time-resource sub-pool.

In one embodiment, the phrase that a second candidate parameter set is determined based on a measurement performed in the second time-resource sub-pool comprises; the second candidate parameter set is determined by monitoring a target signaling in the second time-resource sub-pool.

In one embodiment, the phrase that a second candidate parameter set is determined based on a measurement performed in the second time-resource sub-pool comprises; the second candidate parameter set comprises available time-frequency resources reported to a higher layer that are acquired through sensing in the second time-resource sub-pool according to 3GPP TS 38.213, 38.214 or 36.213.

In one embodiment, the target signaling is monitored in each slot in the second time-resource sub-pool.

In one embodiment, the target signaling is monitored in part of slots in the second time-resource sub-pool.

In one embodiment, the target signaling is monitored in each slot that performs an action other than wireless transmission in the second time-resource sub-pool.

In one embodiment, the target signaling is monitored in each slot that performs an action other than SL wireless transmission in the second time-resource sub-pool.

In one embodiment, the target signaling is monitored in each slot that performs wireless reception in the second time-resource sub-pool.

In one embodiment, the target signaling is monitored in each slot that performs an SL wireless reception in the second time-resource sub-pool.

In one embodiment, the phrase monitoring a target signaling in the second time-resource sub-pool comprises performing blind decoding on the target signaling in the second time-resource sub-pool.

In one embodiment, the phrase monitoring a target signaling in the second time-resource sub-pool comprises respectively performing blind decoding in each of multiple RE sets in the second time-resource sub-pool, if the decoding is correct, the target signaling is successfully received; and if the decoding is wrong, the target signaling is not received.

In one embodiment, the phrase monitoring a target signaling in the second time-resource sub-pool comprises performing energy detection on the target signaling in the second time-resource sub-pool.

In one subembodiment of the above embodiment, the phrase sensing a target signaling in the second time-resource sub-pool comprises performing blind decoding on the target signaling in the second time-resource sub-pool, when the target signaling is successfully decoded, acquiring carried priority information that indicates the target radio signal.

In one embodiment, the phrase monitoring a target signaling in the second time-resource sub-pool comprises performing blind decoding on the target signaling in the second time-resource sub-pool and performing energy detection on a target radio signal; the target signaling is used for indicating time-frequency resources occupied by the target radio signal and an MCS employed by the target radio signal.

In one embodiment, the phrase monitoring a target signaling in the second time-resource sub-pool comprises performing blind decoding on the target signaling in the second time-resource sub-pool and performing energy detection on a reference signal of a target radio signal; the target signaling is used for indicating time-frequency resources occupied by the target radio signal and an MCS employed by the target radio signal.

In one embodiment, the phrase monitoring a target signaling in the second time-resource sub-pool comprises performing blind decoding on the target signaling in the second time-resource sub-pool and performing energy detection on a reference signal of a target radio signal: when the target signaling is successfully decoded, acquiring carried priority information that indicates the target radio signal; and the target signaling is used for indicating time-frequency resources occupied by the target radio signal and an MCS employed by the target radio signal.

In one embodiment, the phrase monitoring a target signaling in the second time-resource sub-pool comprises performing blind decoding on the target signaling in the second time-resource sub-pool, performing energy detection on a reference signal of a target radio signal and performing decoding on a target radio signal; the target signaling is used for indicating time-frequency resources occupied by the target radio signal and an MCS employed by the target radio signal.

In one subembodiment of the above three embodiments, the phrase performing energy detection on a reference signal of a target radio signal comprises determining a Physical Sidelink Shared Channel-Reference Signal Received Power (PSSCH-RSRP) parameter set through energy detection.

In another subembodiment of the above three embodiments, the phrase performing energy detection on a reference signal of a target radio signal comprises determining a Sidelink-Received Signal Strength Indication (S-RSSI) parameter set through energy detection.

In another subembodiment of the above three embodiments, the phrase performing energy detection on a reference signal of a target radio signal comprises determining a Sidelink-Reference Signal Receiving Quality (S-RSRQ) parameter set through energy detection.

In one embodiment, the phrase monitoring a target signaling in the second time-resource sub-pool comprises performing a Cyclic Redundancy Check (CRC) on the target signaling in the second time-resource sub-pool.

In one embodiment, a time length of the second time-resource sub-pool is longer than a time length of the first time-resource sub-pool.

In one embodiment, a start time of the second time-resource sub-pool is earlier than a start time of the first time-resource sub-pool.

In one embodiment, an end time of the second time-resource sub-pool is the same as an end time of the first time-resource sub-pool.

In one embodiment, an end time of the second time-resource sub-pool is earlier than an end time of the first time-resource sub-pool.

In one embodiment, there is no overlapping in slot between the second time-resource sub-pool and the first time-resource sub-pool.

In one embodiment, start times of the first time-resource sub-pool and the second time-resource sub-pool are respectively first OFDM symbols in the first time-resource sub-pool and the second time-resource sub-pool.

In one embodiment, start times of the first time-resource sub-pool and the second time-resource sub-pool are respectively first slots in the first time-resource sub-pool and the second time-resource sub-pool.

In one embodiment, end times of the first time-resource sub-pool and the second time-resource sub-pool are respectively last OFDM symbols in the first time-resource sub-pool and the second time-resource sub-pool.

In one embodiment, end times of the first time-resource sub-pool and the second time-resource sub-pool are respectively last slots in the first time-resource sub-pool and the second time-resource sub-pool.

In one embodiment, the second candidate parameter set is unrelated to a measurement performed outside the second time-resource sub-pool.

In one embodiment, the first threshold is fixed.

In one embodiment, the first threshold is configured.

In one embodiment, the first threshold is measured by ms.

In one embodiment, the first threshold is equal to a time length of a positive integer number of OFDM symbol(s), and the OFDM symbol corresponds to a subcarrier spacing of subcarriers occupied by the first radio signal in frequency domain.

In one embodiment, the first threshold is equal to a time length of a positive integer number of slot(s), and the slot corresponds to a subcarrier spacing of subcarriers occupied by the first radio signal in frequency domain.

In one embodiment, the first threshold is equal to a time length of a positive integer number of slot(s), and the slot corresponds to a subcarrier spacing of subcarriers occupied by the target time-frequency resource block in frequency domain.

In one embodiment, the first threshold is equal to a positive integral multiple of Tc, wherein $Tc=1/(480000*4096)$ s.

In one embodiment, the first threshold is represented by a number of OFDM symbol(s).

In one embodiment, the first threshold is represented by a number of slot(s).

In one embodiment, the first threshold can be configured by a second node.

In one embodiment, the first threshold can be configured by a higher layer signaling.

In one embodiment, the first threshold can carry all or part of Information Elements in an RRC signaling.

In one embodiment, the first threshold can carry all or part of fields in an IE in an RRC signaling.

In one embodiment, the first threshold can carry all or part of fields in a Medium Access Control (MAC) layer signaling.

In one embodiment, the first threshold can be carried in DCI.

In one embodiment, the first threshold can be carried in SCI.

In one embodiment, the first threshold can be carried in the first information.

In one embodiment, the phrase that when the length of the first time-resource sub-pool is greater than a first threshold, the first parameter set is determined out of the first candidate parameter set comprises: when the length of the first time-resource sub-pool is greater than the first threshold, the first parameter set is the first candidate parameter set.

In one embodiment, when the length of the first time-resource sub-pool is less than the first threshold, the first parameter set is the first candidate parameter set.

In one embodiment, the phrase that when the length of the first time-resource sub-pool is greater than a first threshold, the first parameter set is determined out of the first candidate parameter set comprises: when the length of the first time-resource sub-pool is greater than a first threshold, a parameter set with PSSCH-RSRP measured to be minimum is selected out of a first candidate parameter set as a first parameter set.

In one embodiment, the phrase that when the length of the first time-resource sub-pool is no less than a first threshold, the first parameter set is determined out of the first candidate parameter set comprises: when the length of the first time-resource sub-pool is greater than a first threshold, a parameter set with S-RSSI measured to be minimum is selected out of a first candidate parameter set as a first parameter set.

In one embodiment, the phrase that when the length of the first time-resource sub-pool is no less than a first threshold, the first parameter set is determined out of the first candidate parameter set comprises: when the length of the first time-resource sub-pool is greater than a first threshold, a parameter set with S-RSRQ measured to be minimum is selected out of a first candidate parameter set as a first parameter set.

In one embodiment, the phrase monitoring a target signaling in the first time-resource sub-pool comprises performing blind decoding on the target signaling in the first time-resource sub-pool, when the target signaling is successfully decoded, acquiring carried priority information that indicates the target radio signal.

In one embodiment, the phrase that when the length of the first time-resource sub-pool is greater than a first threshold, the first parameter set is determined out of the first candidate parameter set comprises: when the length of the first time-resource sub-pool is greater than a first threshold, the priority of selecting the target radio signal out of a first candidate parameter set is lower than a priority of the first radio signal and a parameter set with PSSCH-RSRP measured to be minimum is a first parameter set.

In one embodiment, the phrase that when the length of the first time-resource sub-pool is greater than a first threshold, the first parameter set is determined out of the first candidate parameter set comprises: when the length of the first time-resource sub-pool is greater than a first threshold, the priority of selecting the target radio signal out of a first candidate parameter set is lower than a priority of the first radio signal and a parameter set with S-RSSI measured to be minimum is a first parameter set.

In one embodiment, the phrase that when the length of the first time-resource sub-pool is greater than a first threshold, the first parameter set is determined out of the first candidate parameter set comprises: when the length of the first time-resource sub-pool is greater than a first threshold, the priority of selecting the target radio signal out of a first candidate parameter set is lower than a priority of the first radio signal and a parameter set with S-RSRQ measured to be minimum is a first parameter set.

In one embodiment, the phrase that when the length of the first time-resource sub-pool is less than the first threshold, the first parameter set is determined out of the second candidate parameter set comprises: when the length of the first time-resource sub-pool is less than the first threshold, the first parameter set is the second candidate parameter set.

In one embodiment, when the length of the first time-resource sub-pool is less than the first threshold, the first parameter set is the second candidate parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, a parameter set with PSSCH-RSRP measured to be minimum is selected out of a second candidate parameter set as a first parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, a parameter set with S-RSSI measured to be minimum is selected out of a second candidate parameter set as a first parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, a parameter set with S-RSRQ measured to be minimum is selected out of a second candidate parameter set as a first parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, the priority of selecting the target radio signal out of a second candidate parameter set is lower than a priority of the first radio signal and a parameter set with PSSCH-RSRP measured to be minimum is a first parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, the priority of selecting the target radio signal out of a second candidate parameter set is lower than a priority of the first radio signal and a parameter set with S-RSSI measured to be minimum is a first parameter set.

In one embodiment, the phrase that when the length of the first time-resource sub-pool is less than a first threshold, the first parameter set is determined out of the second candidate parameter set comprises: when the length of the first time-resource sub-pool is less than a first threshold, the priority of selecting the target radio signal out of a second candidate parameter set is lower than a priority of the first radio signal and a parameter set with S-RSRQ measured to be minimum is a first parameter set.

In one embodiment, the first candidate parameter set is used for determining an available time-frequency resource block set.

In one embodiment, the second candidate parameter set is used for determining an available time-frequency resource block set.

In one embodiment, the first parameter set is used for selecting the first time-frequency resource block out of the available time-frequency resource block set.

In one embodiment, the first time-frequency resource block is selected by a higher layer out of the available time-frequency resource block set.

In one embodiment, the phrase that a first parameter is used for determining the first time-frequency resource block comprises: frequency-domain resources of the first time-frequency resource block comprise a frequency-domain resource block occupied by the target radio signal corresponding to the first parameter set.

In one embodiment, the phrase that a first parameter is used for determining the first time-frequency resource block comprises: frequency-domain resources of the first time-frequency resource block comprise a frequency-domain resource block occupied by the target signaling and the target radio signal corresponding to the first parameter set.

In one embodiment, the phrase that a first parameter is used for determining the first time-frequency resource block comprises: time-domain resources of the first time-frequency resource block comprise a subsequent slot of periodic time-domain resources of the target radio signal corresponding to the first parameter set.

In one embodiment, the phrase that a first parameter is used for determining the first time-frequency resource block comprises: time-domain resources of the first time-frequency resource block comprise a subsequent slot of periodic time-domain resources of the target signaling and the target radio signal corresponding to the first parameter set.

In one embodiment, the phrase that a subsequent slot of periodic time-domain resources of the target radio signal is after the first time-resource sub-pool.

In one embodiment, the phrase that a subsequent slot of periodic time-domain resources of the target signaling and the target radio signal is after the first time-resource sub-pool.

In one embodiment, the phrase that a first parameter is used for determining the first time-frequency resource block comprises; the priority of the target radio signal selected out of the first parameter set is lower than a priority of the first radio signal and a frequency-domain resource block with PSSCH-RSRP measured to be minimum is a frequency-domain resource of the first time-frequency resource block.

In one embodiment, the phrase that a first parameter is used for determining the first time-frequency resource block comprises; the priority of the target radio signal selected out of the first parameter set is lower than a priority of the first radio signal and a frequency-domain resource block with S-RSSI measured to be minimum is a frequency-domain resource of the first time-frequency resource block.

In one embodiment, the phrase that a first parameter is used for determining the first time-frequency resource block comprises; the priority of the target radio signal selected out of the first parameter set is lower than a priority of the first radio signal and a frequency-domain resource block with S-RSRQ measured to be minimum is a frequency-domain resource of the first time-frequency resource block.

In one embodiment, the phrase that a first parameter is used for determining the first time-frequency resource block comprises; the priority of the target radio signal selected out of the first parameter set is lower than a priority of the first radio signal and a subsequent slot of periodic time-domain resources occupied by the target signaling and the target radio signal corresponding to a parameter set with PSSCH-RSRP measured to be minimum is a time-domain resource of the first time-frequency resource block.

In one embodiment, the phrase that a first parameter is used for determining the first time-frequency resource block comprises; the priority of the target radio signal selected out of the first parameter set is lower than a priority of the first radio signal and a subsequent slot of periodic time-domain resources occupied by the target signaling and the target radio signal corresponding to a parameter set with S-RSSI measured to be minimum is a time-domain resource of the first time-frequency resource block.

In one embodiment, the phrase that a first parameter is used for determining the first time-frequency resource block comprises; the priority of the target radio signal selected out of the first parameter set is lower than a priority of the first radio signal and a subsequent slot of periodic time-domain resources occupied by the target signaling and the target radio signal corresponding to a parameter set with S-RSRQ measured to be minimum is a time-domain resource of the first time-frequency resource block.

In one embodiment, the phrase that a first parameter is used for determining the first time-frequency resource block comprises: a time-frequency resource block is randomly selected out of the first parameter set as the first time-frequency resource block.

In one embodiment, the phrase that a first parameter is used for determining the first time-frequency resource block comprises: frequency-domain resources of the first time-frequency resource block comprise a frequency-domain resource block occupied by the target radio signal.

In one embodiment, the phrase that a first parameter is used for determining the first time-frequency resource block comprises: frequency-domain resources of the first time-frequency resource block comprise a frequency-domain resource block occupied by the target signaling and the target radio signal.

In one embodiment, the phrase that a first parameter is used for determining the first time-frequency resource block comprises: time-domain resources of the first time-frequency resource block comprise a subsequent slot of periodic time-domain resources of the target radio signal.

In one embodiment, the phrase that a first parameter is used for determining the first time-frequency resource block comprises: time-domain resources of the first time-frequency resource block comprise a subsequent slot of periodic time-domain resources of the target signaling and the target radio signal.

Embodiment 7

Figure 7:
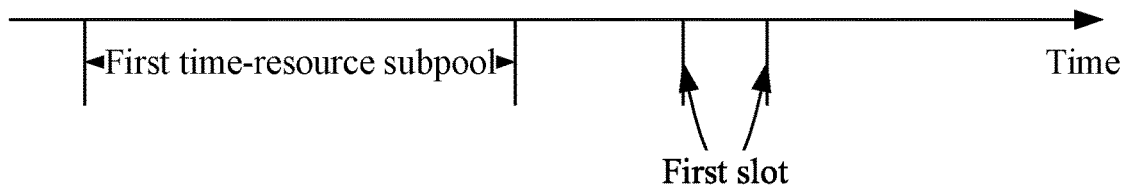
FIG. 7 illustrates a schematic diagram of a first time-resource sub-pool according to one embodiment of the present disclosure.

Embodiment 7 illustrates a schematic diagram of a first time-resource sub-pool according to one embodiment of the present disclosure, as shown in FIG. 7. In FIG. 7, the first time-resource sub-pool is continuous in time domain.

In one embodiment, the first time-resource pool comprises a positive integer number of slot(s).

In one embodiment, a slot comprises 14 multicarrier symbols.

In one embodiment, a slot comprises 12 multicarrier symbols.

In one embodiment, a slot comprises a SCI search space.

In one embodiment, a first time-frequency resource block belongs to a first slot in time domain; and the first slot is after the first time-resource sub-pool.

Embodiment 8

Figure 8:
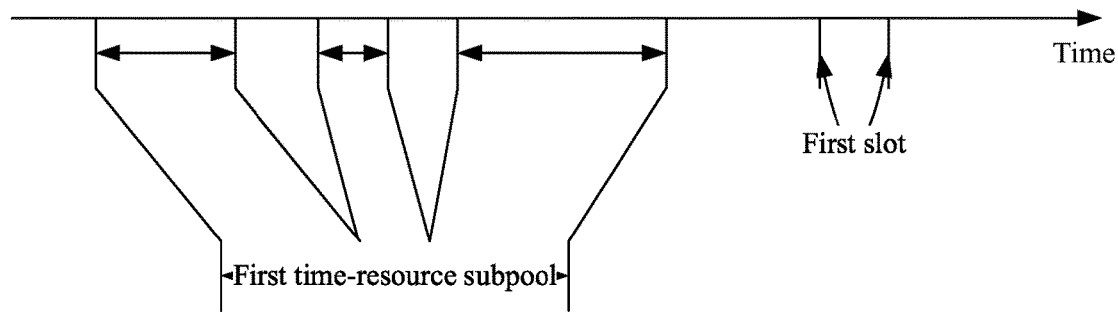
FIG. 8 illustrates another schematic diagram of a first time-resource sub-pool according to one embodiment of the present disclosure.

Embodiment 8 illustrates another schematic diagram of a first time-resource sub-pool according to one embodiment of the present disclosure, as shown in FIG. 8. In FIG. 8, the first time-resource sub-pool is discontinuous in time domain.

In one embodiment, the first time-resource sub-pool comprises a positive integer number of slot(s).

In one embodiment, a slot in the first time-resource sub-pool is reserved for V2X.

In one embodiment, a slot in the first time-resource sub-pool is reserved for a V2X resource pool.

In one embodiment, a first time-frequency resource block belongs to a first slot in time domain; and the first slot is after than the first time-resource sub-pool.

In one embodiment, the first slot is reserved for V2X.

In one embodiment, the first time-resource sub-pool and the first slot are reserved for a same V2X resource pool.

Embodiment 9

Figure 9:
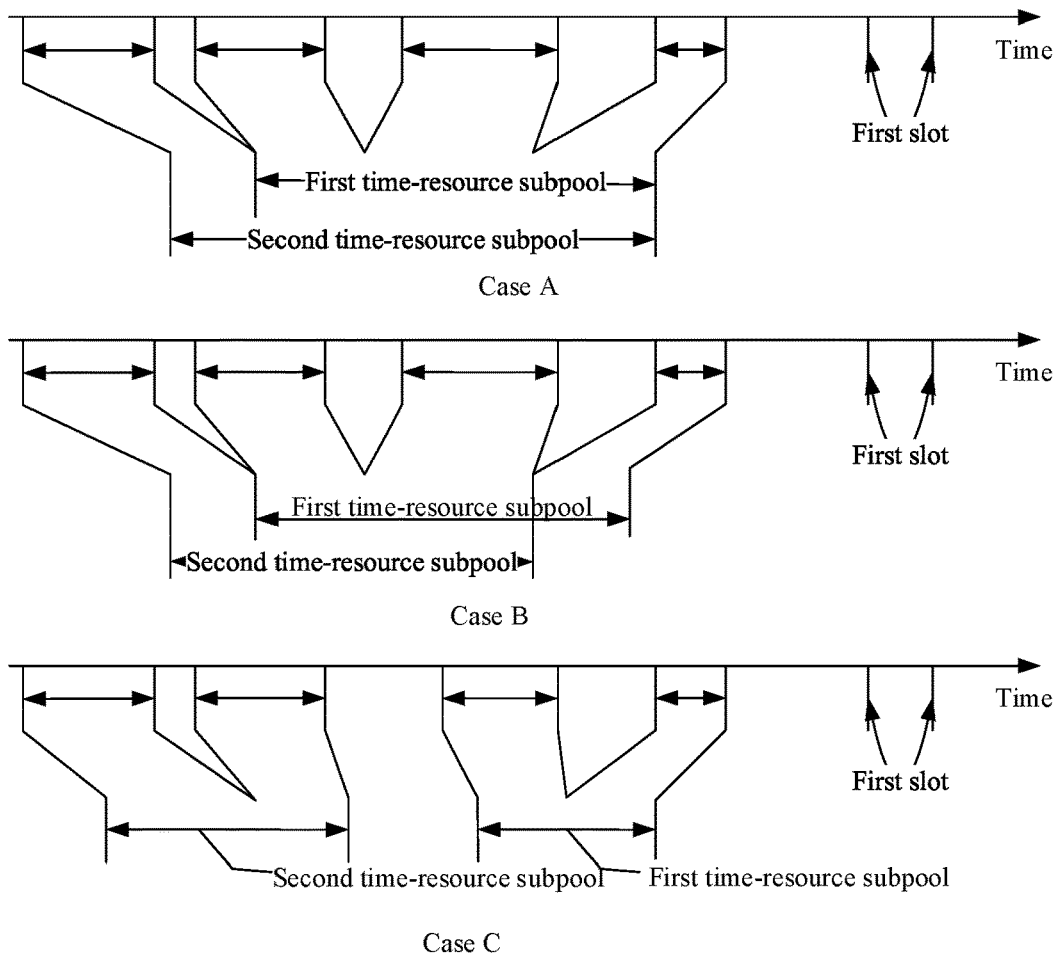
FIG. 9 illustrates a schematic diagram of a relation between a first time-resource sub-pool and a second time-resource sub-pool according to one embodiment of the present disclosure.

Embodiment 9 illustrates a schematic diagram of a relation between a first time-resource sub-pool and a second time-resource sub-pool according to one embodiment of the present disclosure, as shown in FIG. 9. In FIG. 9, the first time-resource sub-pool is discontinuous in time domain, and the second time-resource sub-pool is also discontinuous in time domain.

In one embodiment, the first time-resource sub-pool comprises a positive integer number of slot(s).

In one embodiment, a slot in the first time-resource sub-pool is reserved for V2X.

In one embodiment, a slot in the first time-resource sub-pool is reserved for a V2X resource pool.

In one embodiment, the second time-resource pool comprises a positive integer number of slot(s).

In one embodiment, a slot in the second time-resource sub-pool is reserved for V2X.

In one embodiment, a slot in the second time-resource sub-pool is reserved for a V2X resource pool.

In one embodiment, a first time-frequency resource block belongs to a first slot in time domain; and the first slot is after the first time-resource sub-pool.

In one embodiment, a first time-frequency resource block belongs to a first slot in time domain; and the first slot is after the second time-resource sub-pool.

In one embodiment, a first time-frequency resource block belongs to a first slot in time domain; and the first slot is after the first time-resource sub-pool and the second time-resource sub-pool.

In one embodiment, the first slot is reserved for V2X.

In one embodiment, the first time-resource sub-pool, the second time-resource sub-pool and the first slot are reserved for a same V2X resource pool.

In case A of the Embodiment 9, an end time of the second time-resource sub-pool is the same as that of the first time-resource sub-pool, and part of slots comprised in the second time-resource sub-pool is before the first time-resource sub-pool.

In case B of the Embodiment 9, an end time of the second time-resource sub-pool is before that of the first time-resource sub-pool, and part of slots comprised in the second time-resource sub-pool is before the first time-resource sub-pool.

In case C of the Embodiment 9, all slots comprised in the second time-resource sub-pool are before the first time-resource sub-pool.

Embodiment 10

Figure 10:
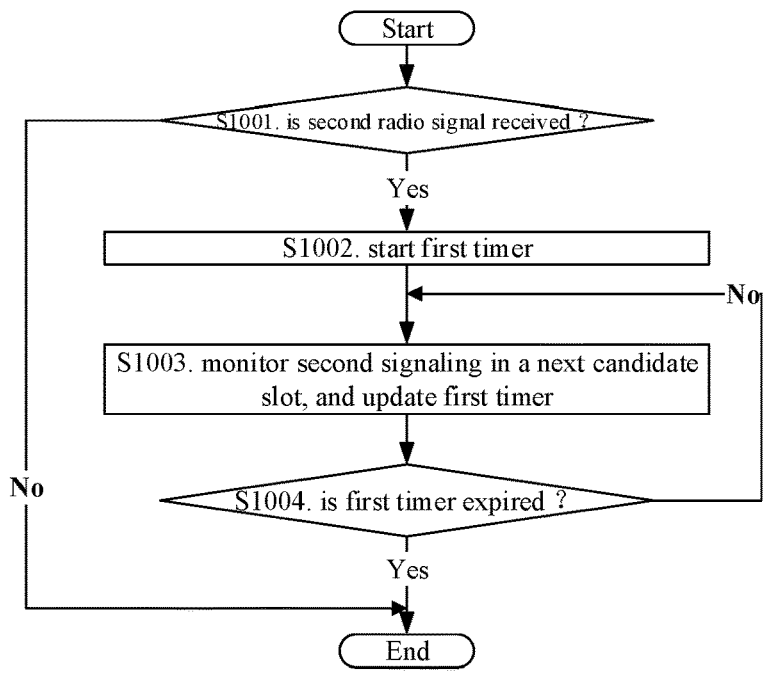
FIG. 10 illustrates a flowchart of maintaining a first timer according to one embodiment of the present disclosure.

Embodiment 10 illustrates a flowchart of maintaining a first timer according to one embodiment of the present disclosure, as shown in FIG. 10. Steps in FIG. 10 are performed in a first node.

Judge whether a second radio signal is received in step S1001, if yes, start a first timer in step S1002, and if no, end the step: in step S1003, monitor a target signaling in a next candidate slot, and update a first timer: judge whether a first timer expires in step S1004, if yes, end the step, if no, skip back to step S1003.

In one embodiment, the second radio signal is transmitted via an air interface.

In one embodiment, the second radio signal is transmitted via a radio interface.

In one embodiment, the second radio signal is transmitted via a PC5 interface.

In one embodiment, the second radio signal is transmitted via an SL.

In one embodiment, a target receiver of the second radio signal is a UE.

In one embodiment, a target receiver of the second radio signal is an RSU.

In one embodiment, a target receiver of the second radio signal is an OBU.

In one embodiment, a target receiver of the second radio signal is a handheld terminal.

In one embodiment, a target receiver of the second radio signal is a Laptop.

In one embodiment, the second radio signal is transmitted to the first node.

In one embodiment, the starting a first timer is to set the first timer to 0, and the updating the first timer is to increase a value of the first timer by 1; if a value of the first timer is equal to a second expiration value, the first timer expires, otherwise the first timer does not expire.

In one embodiment, the starting a first timer is to set the first timer to a second positive integer, and the updating the first timer is to subtract a value of the first timer by 1; if a value of the first timer is equal to 0, the first timer expires, otherwise the first timer does not expire.

In one embodiment, the second expiration value is a positive integer.

In one embodiment, the second expiration value is a fixed value.

In one embodiment, the second expiration value is configured by a Downlink signaling.

In one embodiment, the second expiration value is configured by the first information.

In one embodiment, the second positive integer is fixed.

In one embodiment, the second positive integer is configured by a Downlink signaling.

In one embodiment, the second positive integer is configured by the first information.

In one embodiment, the downlink signaling is a higher-layer signaling.

In one embodiment, the downlink signaling is Broadcast.

In one embodiment, the next candidate slot is a nearest upcoming one.

In one embodiment, the next candidate slot is a nearest upcoming slot reserved for V2X.

In one embodiment, the next candidate slot is a nearest upcoming slot reserved for a same V2X resource pool.

In one embodiment, the first timer is a drx-Inactivity Timer.

In one embodiment, the first timer is a drx-Inactivity TimerSL.

In one embodiment, in the step S1001 (that is, when the first node does not receive the second radio signal), the first timer's count is maintained (that is, the first timer is running); in the step S1002 (that is, when the first signal receives the second radio signal), the first timer is restarted.

In one embodiment, in the step S1001 (that is, when the first node does not receive the second radio signal), the first timer's halted state is maintained; in the step S1002 (that is, when the first signal receives the second radio signal), the first timer is started.

In one embodiment, when the first timer expires, a second timer is started in a next first OFDM symbol.

In one embodiment, when the first timer expires, a second timer is started in a next first OFDM symbol reserved for V2X.

In one embodiment, when the first timer expires, a second timer is started in a next first OFDM symbol reserved for SL transmission.

In one embodiment, the second timer is drx-ShortCycle Timer.

In one embodiment, the second timer is drx-ShortCycle TimerSL.

In one embodiment, when the first timer is running, the first node is in a continuous reception state; when the second timer is running, the first node is in a discontinuous reception state.

In one embodiment, when the first timer is running, the first node is in a DRX short cycle: when the second timer is running, the first node is in a DRX long cycle.

In one embodiment, the first information comprises an initial value of the second timer.

Embodiment 11

Figure 11:
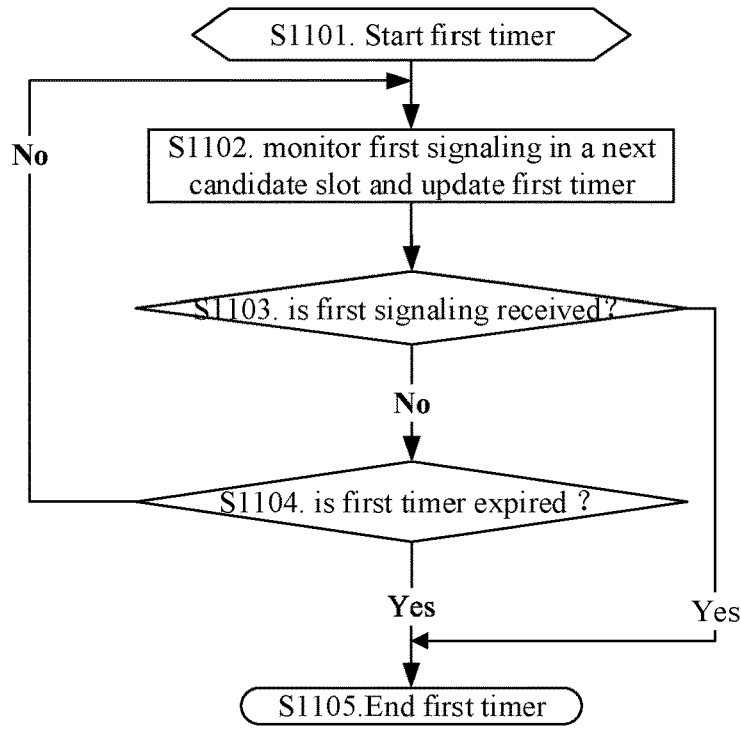
FIG. 11 illustrates another flowchart of maintaining a first timer according to one embodiment of the present disclosure.

Embodiment 11 illustrates another flowchart of maintaining a first timer according to one embodiment of the present disclosure, as shown in FIG. 11. Steps in FIG. 11 are performed in a first node.

Start a first timer in step S1101; in step S1102, monitor a first signaling in a next candidate slot, and update a first timer; in step S1103, judge whether the first signaling is received, if no, perform step S1104, and if yes, skip to step S1105; in step S1104, judge whether the first timer expires, if yes, perform step S1105, and if no, skip back to step S1102.

In one embodiment, when a first OFDM symbol after a specific signal is transmitted, the first node starts the first timer.

In one embodiment, the specific signal is a HARQ feedback signaling, and the HARQ feedback signaling is feedback on whether a received third signal is correctly decoded.

In one embodiment, the specific signal is a fourth radio signal.

In one embodiment, when a first OFDM symbol after the specific signal is transmitted, the first node starts a Round-Trip Time (RTT) timer.

In one embodiment, at a first OFDM symbol after the RTT timer of the first node expires, the first node starts the first timer.

In one embodiment, at a first OFDM symbol after the SL RTT timer of the first node expires, the first node starts the first timer.

In one embodiment, when the third radio signal is not successfully decoded, and at a first OFDM symbol after the RTT timer of the first node expires, the first node starts the first timer.

In one embodiment, when the third radio signal is not successfully decoded, and at a first OFDM symbol after the SL RTT timer of the first node expires, the first node starts the first timer.

In one embodiment, the first signaling is a scheduling signaling that schedules a retransmission of the third radio signal; the first signaling indicates time-frequency resources occupied by the third radio signal and a MCS employed by the third radio signal.

In one embodiment, the first signaling is a scheduling signaling that schedules a retransmission of the fourth radio signal; and the first signaling indicates time-frequency resources occupied by the fourth radio signal and a MCS employed by the fourth radio signal.

In one embodiment, the first signaling is a downlink scheduling signaling.

In one embodiment, the first signaling is an SL scheduling signaling.

In one embodiment, the first signaling is transmitted from a higher layer to a physical layer.

In one embodiment, the third signal and the fourth signal are respectively Unicast.

In one embodiment, the third signal and the fourth signal are respectively Groupcast.

In one embodiment, for transmission of the third radio signal, HARQ function is enabled.

In one embodiment, the third signal and the fourth signal are respectively transmitted via an air interface.

In one embodiment, the third signal and the fourth signal are respectively transmitted via a radio interface.

In one embodiment, the third signal and the fourth signal are respectively transmitted via a PC5 interface.

In one embodiment, the third signal and the fourth signal are respectively transmitted via an SL.

In one embodiment, all or part of a Transport Block (TB) is used for generating the third radio signal.

In one embodiment, all or part of a TB and a reference signal are used for generating the third radio signal.

In one embodiment, all or part of a TB is used for generating the fourth radio signal.

In one embodiment, all or part of a TB and a reference signal are used for generating the fourth radio signal.

In one embodiment, target receivers of the third signal and the fourth signal are respectively UEs.

In one embodiment, target receivers of the third signal and the fourth signal are respectively RSUs.

In one embodiment, target receivers of the third signal and the fourth signal are respectively OBUs.

In one embodiment, target receivers of the third signal and the fourth signal are respectively hand-held terminals.

In one embodiment, target receivers of the third signal and the fourth signal are respectively Laptops.

In one embodiment, a target receiver of the third radio signal is the first node in the present disclosure.

In one embodiment, a target receiver of the fourth radio signal is a node other than the first node in the present disclosure.

In one embodiment, the starting a first timer is to set the first timer to 0, and the updating the first timer is to increase a value of the first timer by 1; if the first timer is equal to a third expiration value, the first timer expires, otherwise the first timer does not expire.

In one embodiment, the starting a first timer is to set the first timer to a third positive integer, and the updating the first timer is to subtract a value of the first timer by 1; if the first timer is equal to 0, the first timer expires, otherwise the first timer does not expire.

In one embodiment, the third expiration value is a positive integer.

In one embodiment, the third expiration value is a fixed value.

In one embodiment, the third expiration value is configured by a Downlink signaling.

In one embodiment, the third expiration value is configured by the first information.

In one embodiment, the third positive integer is fixed.

In one embodiment, the third positive integer is configured by a Downlink signaling.

In one embodiment, the third positive integer is configured by the first information.

In one embodiment, the downlink signaling is a higher-layer signaling.

In one embodiment, the downlink signaling is Broadcast.

In one embodiment, the next candidate slot is a nearest upcoming one.

In one embodiment, the next candidate slot is a nearest upcoming slot reserved for V2X.

In one embodiment, the next candidate slot is a nearest upcoming slot reserved for a same V2X resource pool.

In one embodiment, the first timer is a drx-Retransmission Timer.

In one embodiment, the first timer is a drx-Retransmission TimerSL.

Embodiment 12

Figure 12:
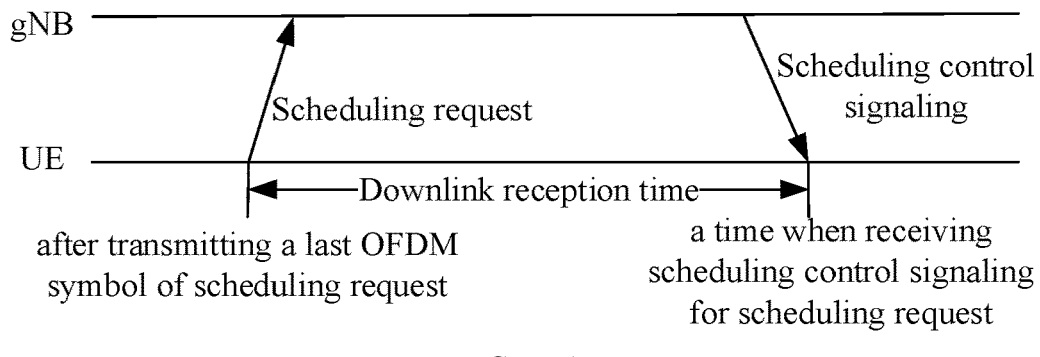
FIG. 12 illustrates a schematic diagram of a Downlink reception time in a first node according to one embodiment of the present disclosure.
Figure 12:
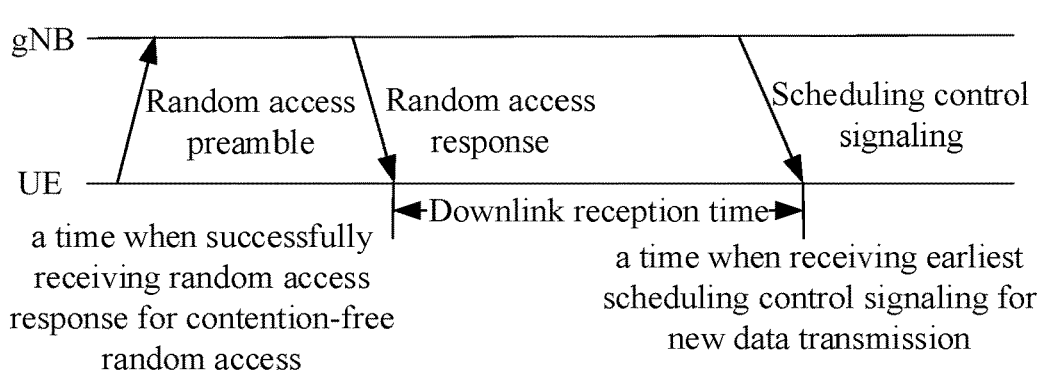

Embodiment 12 illustrates a schematic diagram of downlink reception time in a first node according to one embodiment of the present disclosure, as shown in FIG. 12.

In Case A in Embodiment 12, the first node transmits a scheduling request, and the first node is in downlink reception in a duration from when a last symbol of a scheduling request is transmitted to when a scheduling control signaling for the scheduling request is received; and the downlink reception time belongs to an active time in the first time-resource pool.

In one embodiment, the scheduling request is an Uplink scheduling request.

In one embodiment, the scheduling request is an SL scheduling request.

In case B in Embodiment 12, the first node transmits a random access preamble for contention-free random access; the first node receives random access response information for contention-free random access, and the first node is in downlink reception in a duration from when random access response information for contention-free random access is successfully received to when an earliest scheduling control signaling for new data transmission is received; and the downlink reception time belongs to an active time in the first time-resource pool.

Embodiment 13

Figure 13:
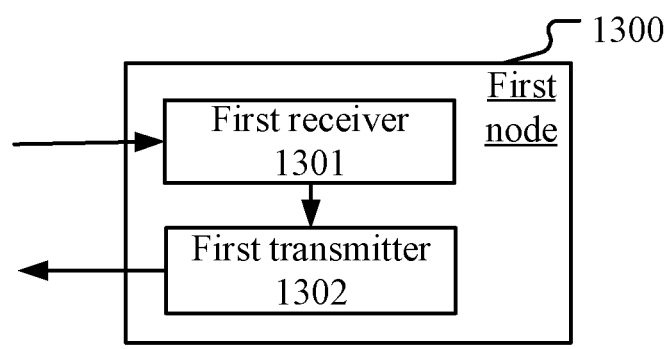
FIG. 13 illustrates a structure block diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, the first node's processing device 1300 comprises a first receiver 1301 and a first transmitter 1302. The first receiver 1301 comprises a transmitter/receiver 456 (including an antenna 460), a receiving processor 452 and a controller/processor 490 in FIG. 4 of the present disclosure; or the first receiver 1301 comprises a transmitter/receiver 556 (including an antenna 560), a receiving processor 552 and a controller/processor 590 in FIG. 5 of the present disclosure; the first transmitter 1302 comprises a transmitter/receiver 456 (including an antenna 460), a transmitting processor 455 and a controller/processor 490: or the first transmitter 1302 comprises a transmitter/receiver 556 (including an antenna 560), a transmitting processor 555 and a controller/processor 590 in FIG. 5 of the present disclosure.

In Embodiment 13, the first receiver 1301 receives first information, and the first information is used for determining an active time in a first time-resource pool; the first receiver 1301 monitors a target signaling in a first time-resource sub-pool; a first transmitter 1302 transmits a first radio signal in a first time-frequency resource block; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, a first timer is maintained; herein, the active time in the first time-resource pool comprises a time when the first timer is running.

In one embodiment, the active time in the first time-resource pool comprises a Downlink reception time; herein, the first radio signal is transmitted on an SL.

In one embodiment, the first receiver 1301 performs a measurement in a second time-resource sub-pool; herein, the second candidate parameter set is determined based on a measurement performed in the second time-resource sub-pool, and at least one slot in the second time-resource sub-pool is prior to the first time-resource sub-pool.

In one embodiment, when the length of the first time-resource sub-pool is greater than a first threshold, the first parameter set is determined out of the first candidate parameter set: when the length of the first time-resource sub-pool is less than a first threshold, the first parameter set is determined out of the second candidate parameter set.

Embodiment 14

Figure 14:
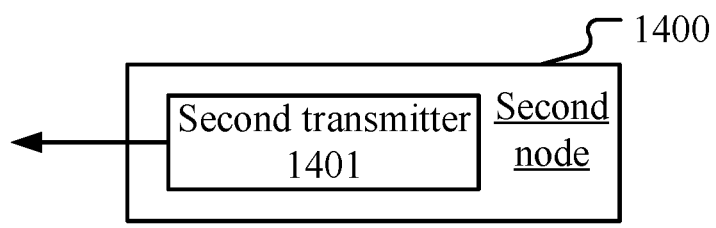
FIG. 14 illustrates a structure block diagram of a processing device in second node according to one embodiment of the present disclosure.

Embodiment 14 illustrates a structure block diagram of a processing device in a second node according to one embodiment of the present disclosure, as shown in FIG. 14. In FIG. 14, the second node's processing device 1400 comprises a second transmitter 1401. The second transmitter 1401 comprises a transmitter/receiver 416 (including an antenna 460), a transmitting processor 415 and a controller/processor 440 in FIG. 4 of the present disclosure, wherein the second transmitter 1401 is optional.

In Embodiment 14, the second transmitter 1401 transmits first information, and the first information is used for indicating an active time in a first time-resource pool; monitors a target signaling in a first time-resource sub-pool; and a first time-frequency resource block is used for transmitting a first radio signal; herein, a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; and a length of the first time-resource sub-pool is used for determining the first parameter set out of the first candidate parameter set and the second candidate parameter set.

In one embodiment, a first timer is maintained; herein, the active time in the first time-resource pool comprises a time when the first timer is running.

In one embodiment, the active time in the first time-resource pool comprises a Downlink transmission time; herein, the first radio signal is transmitted on an SL.

In one embodiment, the target signaling is measured in a second time-resource sub-pool; herein, the second candidate parameter set is determined based on a measurement performed in the second time-resource sub-pool, and at least one slot in the second time-resource sub-pool is prior to the first time-resource sub-pool.

In one embodiment, when the length of the first time-resource sub-pool is greater than a first threshold, the first parameter set is determined out of the first candidate parameter set: when the length of the first time-resource sub-pool is less than a first threshold, the first parameter set is determined out of the second candidate parameter set.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-consumption equipment, enhanced Machine Type Communication (eMTC) devices, NB-IoT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving first information, the first information being used for determining an active time in a first time-resource pool; monitoring a target signaling in a first time-resource sub-pool; and
a first transmitter, transmitting a first radio signal in a first time-frequency resource block;
wherein a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; the second candidate parameter set is determined based on a measurement performed in a second time-resource sub-pool, and at least one slot in the second time-resource sub-pool is prior to the first time-resource sub-pool; and a length of the first time-resource sub-pool is used for determining the first parameter set out of the first candidate parameter set and the second candidate parameter set.

2. The first node according to claim 1, comprising:
maintaining a first timer;
wherein the active time in the first time-resource pool comprises a time when the first timer is running.

3. The first node according to claim 1, comprising:
the active time in the first time-resource pool comprising a Downlink reception time;
wherein the first radio signal is transmitted on a Sidelink.

4. The first node according to claim 1,
wherein the first candidate parameter set and the second parameter set both comprise available time-frequency resources.

5. The first node according to claim 1, wherein when the length of the first time-resource sub-pool is greater than a first threshold, the first parameter set is determined out of the first candidate parameter set; and when the length of the first time-resource sub-pool is less than the first threshold, the first parameter set is determined out of the second candidate parameter set.

6. The first node according to claim 5, wherein the first threshold is carried in all or part of IEs in a Radio Resource Control (RRC) signaling.

7. The first node according to claim 1, wherein the target signaling is Sidelink Control Information (SCI).

8. The first node according to claim 4, wherein a time length of the second time-resource sub-pool is greater than a time length of the first time-resource sub-pool.

9. A second node for wireless communications, comprising:
a second transmitter, transmitting first information, the first information indicating an active time in a first time-resource pool;
wherein
a first parameter set is used for determining the first time-frequency resource block by the receiver of the first information, the first time-resource sub-pool belongs to the active time in the first time-resource pool, and the first parameter set is one of a first candidate parameter set or a second candidate parameter set;
the first candidate parameter set is determined based on a measurement performed in the first time-resource sub-pool by the receiver of the first information;
the second candidate parameter set is determined based on a measurement performed in a second time-resource sub-pool by the receiver of the first information;
at least one slot in the second time-resource sub-pool is prior to the first time-resource sub-pool; and
a length of the first time-resource sub-pool is used for determining the first parameter set out of the first candidate parameter set and the second candidate parameter set by the receiver of the first information.

10. The second node according to claim 9, wherein
a first timer is maintained by the receiver of the first information;
the active time in the first time-resource pool comprises a time when the first timer is running.

11. The second node according to claim 9, wherein
the active time in the first time-resource pool comprises a Downlink transmission time;
the first radio signal is transmitted on a Sidelink.

12. The second node according to claim 9,
wherein the first candidate parameter set and the second parameter set both comprise available time-frequency resources.

13. The second node according to claim 9, wherein when the length of the first time-resource sub-pool is greater than a first threshold, the first parameter set is determined out of the first candidate parameter set; and when the length of the first time-resource sub-pool is less than a first threshold, the first parameter set is determined out of the second candidate parameter set.

14. The second node according to claim 13, wherein the first threshold is carried in all or part of IEs in an RRC signaling.

15. The second node according to claim 9, wherein the target signaling is SCI.

16. The second node according to claim 12, wherein a time length of the second time-resource sub-pool is greater than a time length of the first time-resource sub-pool.

17. A method in a first node for wireless communications, comprising:

receiving first information, the first information being used for determining an active time in a first time-resource pool; monitoring a target signaling in a first time-resource sub-pool; and transmitting a first radio signal in a first time-frequency resource block;

wherein a first parameter set is used for determining the first time-frequency resource block, the first time-resource sub-pool belongs to the active time in the first time-resource pool, and the first parameter set is one of a first candidate parameter set or a second candidate parameter set; the first candidate parameter set is determined based on a measurement performed in the first time-resource sub-pool; the second candidate parameter set is determined based on a measurement performed in a second time-resource sub-pool, and at least one slot in the second time-resource sub-pool is prior to the first time-resource sub-pool; and a length of the first time-resource sub-pool is used for determining the first parameter set out of the first candidate parameter set and the second candidate parameter set.

18. The method in a first node according to claim 17, wherein the first candidate parameter set and the second parameter set both comprise available time-frequency resources.

19. The method in a first node according to claim 17, wherein when the length of the first time-resource sub-pool is greater than a first threshold, the first parameter set is determined out of the first candidate parameter set; and when the length of the first time-resource sub-pool is less than a first threshold, the first parameter set is determined out of the second candidate parameter set.

20. The method in a first node according to claim 18, wherein a time length of the second time-resource sub-pool is greater than a time length of the first time-resource sub-pool.

* * * * *